J. W. Coburn,

Shoe Sole.

No. 2,565. Reissued Apr. 16, 1867

Witnesses.

D. L. Fruburn

W. C. Dey.

Inventor.

Water Proof Sole Company by their attorney

Thomas D. Stetson

United States Patent Office.

THE WATER-PROOF SOLE COMPANY, OF NEW HAVEN, CONNECTICUT, ASSIGNEES BY MESNE ASSIGNMENTS OF JOHN W. COBURN.

*Letters Patent No.* 48,481, *dated June* 27, 1865; *reissue No.* 2,565, *dated April* 16, 1867.

WATER-PROOF SOLES.

The Schedule referred to in these Letters Patent and making part of the same.

TO ALL WHOM IT MAY CONCERN:

Be it known that the undersigned, THE WATER-PROOF SOLE COMPANY, of New Haven, in the county of New Haven, and State of Connecticut, are the assignees of certain Letters Patent of the United States issued to JOHN W. COBURN, deceased, late of New Haven, in the county of New Haven, and State of Connecticut, for Improvements in the Manufacture of Water-Proof Soles for Boots and Shoes, which Letters Patent are dated the twenty-seventh day of June, 1865, and numbered 48,481, and which Letters Patent are herewith returned to the Patent Office, in accordance with the advice of counsel learned in the law, to be surrendered and reissued with this amended specification; and we do hereby declare the following to be a full, clear, and exact description of the same, when taken in connection with the accompanying drawings, and letters of reference marked thereon, and which said drawings constitute part of this specification, and represent, in—

Figure 1:
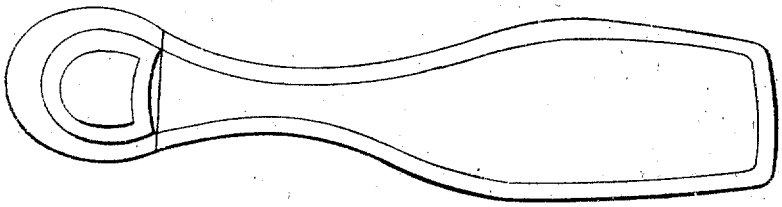

Figure 1, a view of whole sole and heel.

Figure 2:
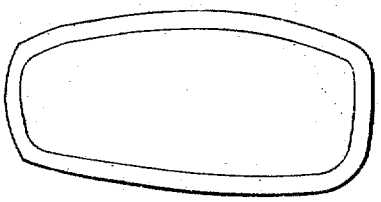

Figure 2, a half sole.

Figure 3:
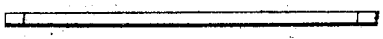

Figure 3, a section of the same; and

Figure 4:
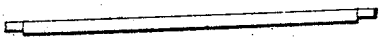

Figure 4, section of half sole, the rubber thicker than its edging.

To enable others skilled in the art to make and apply this improvement we will proceed to fully describe the best manner of so doing. In describing the invention we use the word boot as including every description of boots or shoes.

We first construct a mould of the form and size required for the sole, whether it be for whole sole, fig. 1, half sole, fig. 2, or heel, fig. 1. We then take a narrow strip of sole-leather, place it in the mould around the edge, coating the inner edge of the said leather strip with the proper cement for uniting rubber to the leather. The cement we use is the common rubber cement, composed of about sixteen parts litharge, thirty-two parts India rubber, one part sulphur, ground together and dissolved in camphene or benzine, one gallon to twelve pounds of the compound. We then fill the space within the said leather strip with India rubber, clear, fabricated, or any of its compounds or equivalents therefor; then cure the said rubber, &c., in the usual manner, which completes the sole. We cure our soles in similar manner as for curing common India rubber, that is, while in the mould place them in an oven heated to about 260°, Fahrenheit's scale, for from six to eight hours. The leather should be in proper condition to withstand a high temperature, that is, it should, as is well known, contain little or no oil, and should be as dry as possible. To attach the sole thus prepared to boots, place the sole upon the boot in the usual manner for leather soles, the leather rim around the sole forming the edge, which may be stitched or pegged, and finished in the usual manner.

India-rubber soles have long been used and applied to boots, depending wholly for their security upon the gum placed between the sole of the boot and the rubber soles. Thus applied the soles frequently, and, we might say, generally, crack or "peel" from the sole, a great objection, which this invention entirely overcomes. If, in applying this improved sole, it shall be deemed expedient to introduce gum between the rubber part of the sole and the sole of the boot, it may be done in the usual manner; but it is not essential. The rubber may be, and we prefer to make it, a little thicker than its leather rim, as seen in fig. 4. The surface of the rubber part of the sole may be covered in whole or simply over the seam by thin rubber cloth or other material cemented on, and the joint may be a butt or a lap, and but one, and may be corrugated, roughened, or otherwise prepared to prevent slipping.

Some of the advantages due to certain features of this invention may be separately enumerated as follows:

First. By reason of the fact that the rubber, which, from its peculiar nature, cannot hold ordinary fastenings, extends across the main body of the sole, but does not extend quite to the edge, and is vulcanized in contact with the leather, the sole is made impervious to water, without being sensitive to heat over the main portion of its surface, while the leather is available around the edge for attaching the sole to the other portions of the boot by any of the ordinary means, without, by such fastening, cutting, punching, or in any manner disturbing the rubber.

Second. By reason of the fact that the rubber extends quite through, from one face of the sole to the other, the rubber is combined with the leather by being joined edgewise thereto, and may be better secured against the lateral strains due to kicking and shuffling motions, which are so severely destructive when the rubber is simply stuck, cemented, or vulcanized on the face of the leather alone.

Third. By reason of the fact that the rubber portion may protrude beyond the face of the leather, as represented in fig. 4, so that the wear comes mainly on the rubber, and not on the leather at the edge, the stitches or other fastenings inserted through the leather portion are protected from wear, and the boot will endure for a longer period.

Fourth. By reason of the fact that the rubber cloth, or analogous material, is applied on the surface of the sole and united, as specified, we are able to secure a tough and continuous fibrous surface over the whole or any desired part of the rubber, and to extend the same across the seam or junction of the rubber with the leather, so as to defend it against the commencement of cracks or separations, however severely the compound sole may be bent or strained.

We do not claim attaching previously vulcanized rubber to leather for soles or for other purposes by cementing such vulcanized parts to the leather, and afterwards vulcanizing the rubber cement in place, for this has been before attempted or proposed; but having now fully described the invention, and in what manner the same is best put in practice, what is claimed as the invention of the said COBURN is as follows:

1. We claim a compound sole, presenting a surface of rubber, or analogous gum or its compounds, over the main portion of the sole, and a border of leather, the gum having been applied to the leather while soft, and vulcanized thereon, substantially as and for the purposes herein specified.

2. We claim, in combination with the above, causing the vulcanized material to extend through from one face of the sole to the other, through a hole provided for the purpose in the leather, substantially in the manner and for the purpose herein specified.

3. We claim, in compound soles, having rubber vulcanized with leather, as specified, the protrusion of the rubber face outside of and beyond the face of the leather edging, substantially as represented in fig. 4, and for the purpose herein specified.

4. We claim, in compound soles of rubber and leather, covering the surface, in whole or in part, with thin rubber cloth, or analogous strong fibrous material, attached so as to serve in connection with the rubber and leather, substantially in the manner and for the purposes herein set forth.

WATER-PROOF SOLE COMPANY,
By LEONARD PARDEE, *President.*

Witnesses:
A. B. JACOCKS,
O. F. CASE.